United States Patent [19]

Williams

[11] Patent Number: 4,672,708
[45] Date of Patent: Jun. 16, 1987

[54] MIRROR WIPER ASSEMBLY WITH MANUALLY OPERATED REMOTE CONTROL

[76] Inventor: Harold L. Williams, 6484 W. 1100 S. 35, Marion, Ind. 46952

[21] Appl. No.: 836,836

[22] Filed: Mar. 6, 1986

[51] Int. Cl.⁴ ............................. B60S 1/14; B60S 1/20
[52] U.S. Cl. ................. 15/250 B; 15/250.15; 15/250.18; 15/250.25; 15/250.3
[58] Field of Search .......... 15/250.15, 250.18, 250.25, 15/250.3, 250 B

[56] References Cited

U.S. PATENT DOCUMENTS

| | | | |
|---|---|---|---|
| 1,482,428 | 2/1924 | Dooley | 15/250.25 |
| 2,722,707 | 11/1955 | Musselman | 15/250.25 |
| 2,913,754 | 11/1959 | Vanderzee | 15/253 |
| 3,114,168 | 12/1963 | Taylor | 15/250.15 X |
| 3,139,644 | 7/1964 | Smith | 15/250.30 |
| 3,158,935 | 12/1964 | Rosenthal | 15/250.15 X |
| 3,461,476 | 8/1969 | North | 15/250.04 |
| 3,685,087 | 8/1972 | Pittman | 15/250.24 |
| 3,855,661 | 12/1974 | Prince | 15/250.01 |
| 3,866,258 | 2/1975 | Degraw | 15/250.29 |
| 4,212,091 | 7/1980 | Jones | 15/250 B |
| 4,306,328 | 12/1981 | Layton | 15/250 B |
| 4,457,597 | 7/1984 | Degideo | 350/582 |
| 4,459,718 | 7/1984 | Hewitt et al. | 15/250 B |
| 4,466,712 | 8/1984 | Vitaloni | 15/250 B X |
| 4,527,301 | 7/1985 | Seitz | 15/250 B |

FOREIGN PATENT DOCUMENTS

| | | | |
|---|---|---|---|
| 601905 | 3/1926 | France | 15/250.3 |
| 978450 | 12/1964 | United Kingdom | 15/250.3 |
| 1412753 | 11/1975 | United Kingdom | . |
| 2065459 | 12/1979 | United Kingdom | . |

Primary Examiner—Peter Feldman
Attorney, Agent, or Firm—Jeffers, Irish & Hoffman

[57] ABSTRACT

A wiper assembly for a mirror including a frame and a wiper arm mechanism. The wiper arm mechanism includes a wiper blade and has a rest position and a stop position. A manually operated remote control is provided for actuating the wiper arm mechanism from the rest position to the stop position. A spring is provided to return the wiper arm mechanism from the stop position to the rest position. The manually operated remote control is in the form of a Bowden wire. In another embodiment, the manually operated remote control consists of a pneumatic cylinder and valve mechanism and causes the wiper arm mechanism to move through a complete cycle.

4 Claims, 5 Drawing Figures

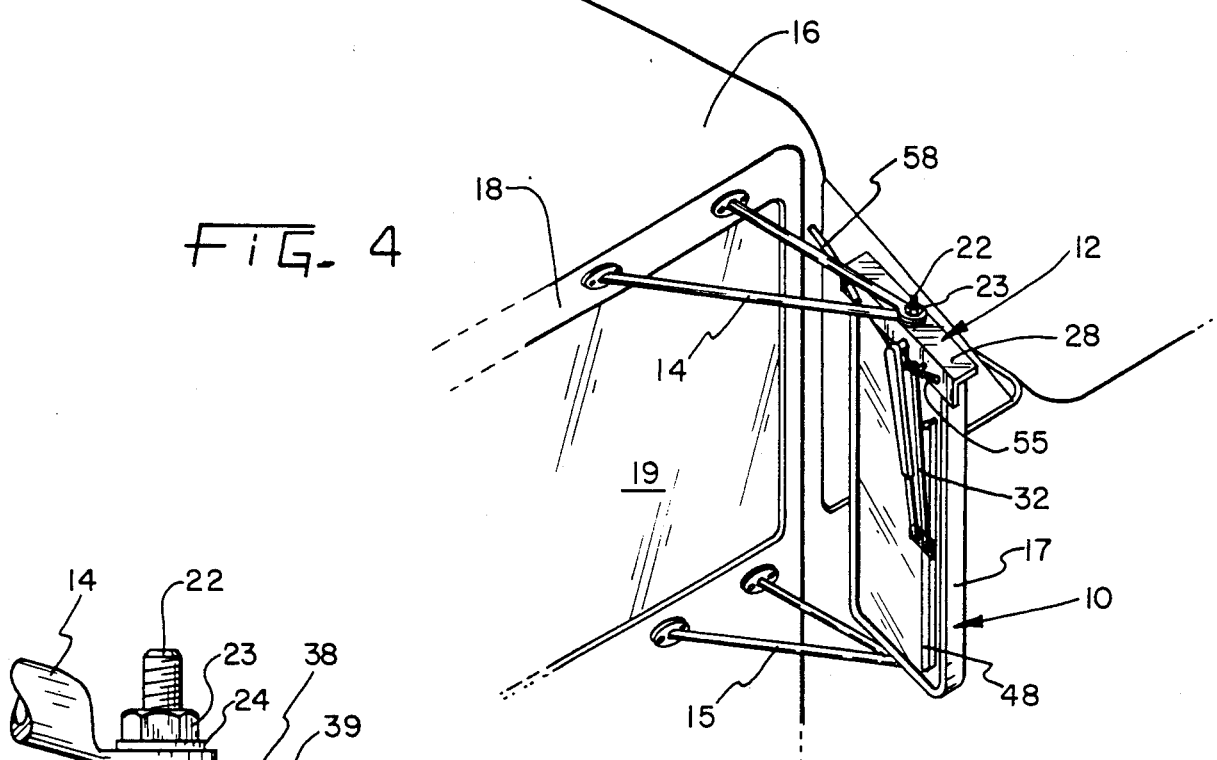
FIG. 4
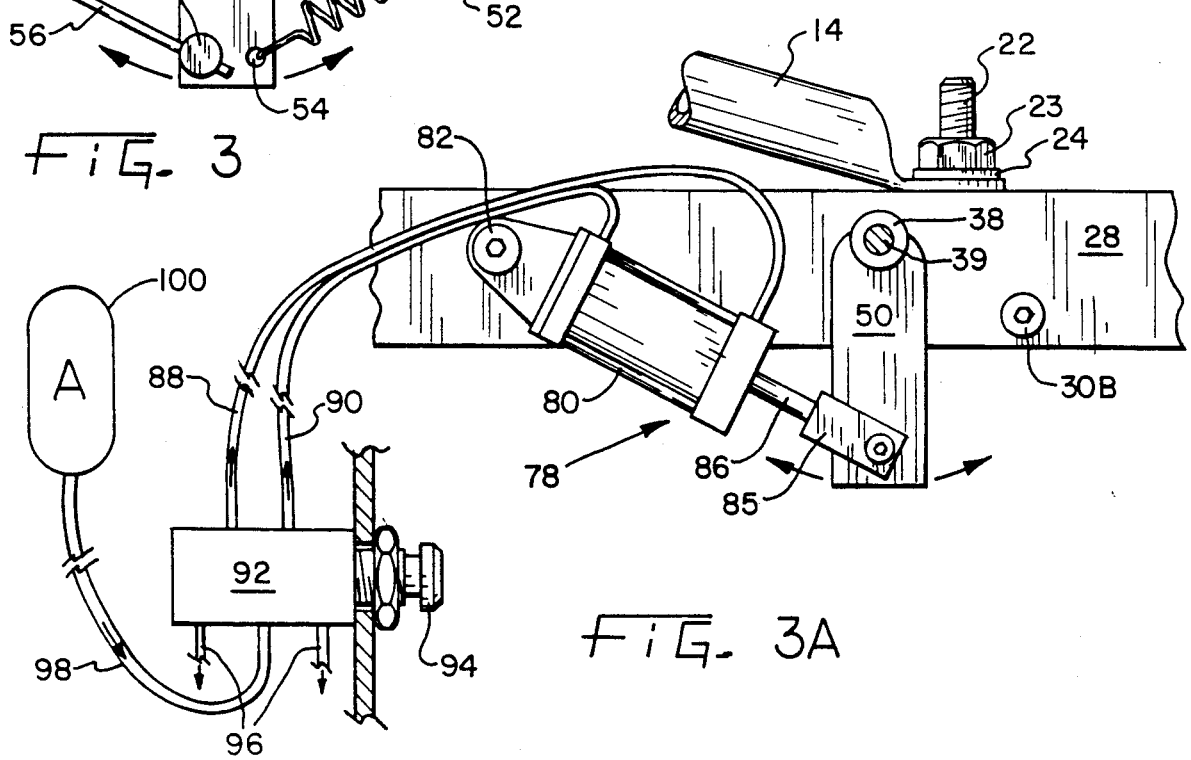
FIG. 3
FIG. 3A

MIRROR WIPER ASSEMBLY WITH MANUALLY OPERATED REMOTE CONTROL

BACKGROUND OF THE INVENTION

This invention relates to a wiper mechanism for a rear view mirror and more particularly to an improved wiper assembly for rear view mirrors of vehicles such as trucks and the like, wherein the wiper assemblies can be remotely operated from within the truck cab.

External rear view mirrors for vehicles such as trucks are generally located on both the driver side and passenger side of the vehicle and are within view of the driver so that the driver can observe traffic conditions behind the vehicle. Such mirrors are essential in large vehicles such as buses and trucks. External mirrors, being located outside of the vehicle, are exposed to the elements and often become coated with rain, snow, splashed mud and dirt, and the like, and therefore create hazardous conditions if the driver can no longer clearly observe traffic conditions. It is therefore necessary for the driver to periodically clean the mirrors. Since the cabs of trucks and buses are very wide so that the driver cannot reach both outside mirrors from the driver's seat, the driver must stop the vehicle to clean the mirrors. If the driver elects to stay in the vehicle, he must roll down the windows to clean the mirrors. This is inconvenient, particularly in inclement weather and in winter time. Alternatively, the driver may leave the vehicle cab to clean the mirrors. However, when the vehicle is in heavy traffic, the driver cannot stop the vehicle immediately but must wait until he finds a suitable location where he can park the vehicle to properly clean the mirrors. Thus, the mirrors constitute a potential safety hazard until they are cleaned. Furthermore, the time necessary to park the vehicle and clean the mirrors constitutes undesirable down time for the vehicle.

Prior art mirror assemblies have been provided wherein a motorized mirror and wiper mechanism is provided for replacement of existing mirrors on vehicles. Generally, such motorized wiper mechanisms have been powered by either hydraulic or electric motors. Therefore, to provide such mechanisms, the existing mirrors must be removed from the vehicle, power supply lines, such as electric lines or hydraulic lines, must be provided to supply power to the motorized assembly, and the motorized assembly must then be installed to replace the existing mirrors. Therefore, a disadvantage of such prior art mirror and motorized wiper assemblies has been the expense of providing the mirror and wiper assemblies and, furthermore, the expense and difficulty of installing the assemblies. A further disadvantage of the prior art assemblies has been that they have been rather complicated and therefore are subject to mechanical breakdowns. This is particularly true with respect to many of the prior art motorized wiper assemblies wherein linear up and down movement of the wiper blade is provided by means of a pair of parallel tracks and rollers which operate in the tracks. In such arrangements, it is difficult to keep the wiper blade perfectly horizontal and prevent the blade from binding up. This is especially true in below freezing temperatures when snow and ice tends to collect on the mirrors. Furthermore, corrosion of parts due to the exposure of the wiper and mirror assembly to moisture tends to cause malfunction of such motorized mechanisms over a period of time.

It is, therefore, desired to provide a simple, inexpensive and reliable mirror and wiper assembly which is easy to install on an existing mirror and which may be manually operated by remote control to wipe the mirror.

SUMMARY OF THE INVENTION

The present invention overcomes the disadvantages of the above-described mirror and wiper assemblies by providing a remotely controlled wiper assembly which may be mounted on existing mirrors.

The wiper assembly of the present invention, in one form thereof, includes a frame which may be secured to a mirror assembly and a wiper arm mechanism which is secured to the frame. The wiper arm has a rest position and a stop position and further includes a wiper blade. A manually operated remote control selectively actuates the wiper arm mechanism to move the wiper arm from the rest position to the stop position.

The wiper assembly of the present invention, in one form thereof, includes a frame which may be secured to an existing rear view mirror assembly. A wiper arm mechanism is pivotably secured to the frame and includes a rest position and a stop position. A wiper blade is connected to the free end of the wiper arm mechanism. A manually operated remote control is provided for actuating the wiper arm mechanism from the rest position to the stop position. The remote control includes a Bowden wire which has one end connected to the wiper arm mechanism and another end connected to a manually operated actuator. A return spring is provided on the wiper mechanism to return the wiper arm to its rest position after the manual actuator has caused the wiper arm to be moved to its stop position. In another embodiment, the Bowden wire and return spring may be replaced by a pneumatic cylinder and a valve mechanism whereby the operation of the manual actuator causes the wiper arm mechanism to move through a complete cycle from the rest position to the stop position and back to the rest position.

One advantage of the assembly of the present invention is that it is simple and inexpensive to manufacture.

Another advantage of the present invention is that it is relatively easy to install and that existing mirrors may be utilized.

A further advantage of the present invention is that, to mount the wiper assembly on a vehicle mirror, no electrical or hydraulic power supply lines need to be provided to operate the wiper assembly.

Still another advantage of the present invention is that the wiper assembly may be manually remotely operated and that the actuator may be located at any convenient location.

A yet further advantage of the present invention is that the manually operated wiper mechanism is more effective and reliable than prior art motorized mirror wiper assemblies.

The present invention, in one form thereof, provides a frame, wherein a wiper arm mechanism including a wiper blade is moveably secured to the frame and which has a rest position and a stop position. A manually operated remote control is operatively associated with the wiper arm mechanism to enable the wiper arm mechanism to be moved from the rest position to the stop position.

The present invention, in one form thereof, further provides a wiper assembly for a rear view mirror. The wiper assembly includes a frame and a wiper arm mechanism pivotably secured to the frame and having a rest position and a stop position. A wiper blade is connected to the free end of the wiper arm mechanism. A manually operated remote control is provided for actuating the wiper arm mechanism from the rest position to the stop position. The remote control includes a Bowden wire having one end connected to the wiper arm mechanism and another end connected to a manually operated actuator.

The present invention, in one form thereof, still further provides a wiper assembly for a rear view mirror wherein the assembly comprises a frame and a wiper arm mechanism pivotably secured to the frame. The wiper arm mechanism has a rest position and a stop position. A wiper blade is connected to the free end of the wiper arm mechanism. A manually operated remote control is provided for actuating the wiper arm mechanism from the rest position to the stop position. The manually operated control includes a pneumatic cylinder, a valve for supplying air to the cylinder, and a manually operable actuator.

It is an object of the present invention to provide a simple inexpensive and reliable wiper assembly for rear view mirrors.

It is a further object of the present invention to provide a wiper assembly which may be mounted on existing rear view mirrors.

Another object of the present invention is to provide a manually actuated remotely controlled wiper assembly for rear view mirrors.

Still another object of the present invention is to provide a remotely controlled wiper assembly for rear view mirrors wherein no electrical or hydraulic power line hook ups need to be provided to operate the wiper assembly.

A still further object of the present invention is to provide an effective and simple wiper arm assembly which may be manually remotely controlled.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 3 is an enlarged broken away view of the actuating mechanism for the wiper assembly of FIG. 1;

FIG. 3A is an enlarged broken away view of another embodiment of the actuating mechanism for the wiper assembly of FIG. 1;

FIG. 4 is a partial perspective view of a vehicle cab and mirror structure with the wiper assembly secured thereto.

Corresponding reference characters indicate corresponding parts throughout the several views of the drawings.

Figures 1, 2:
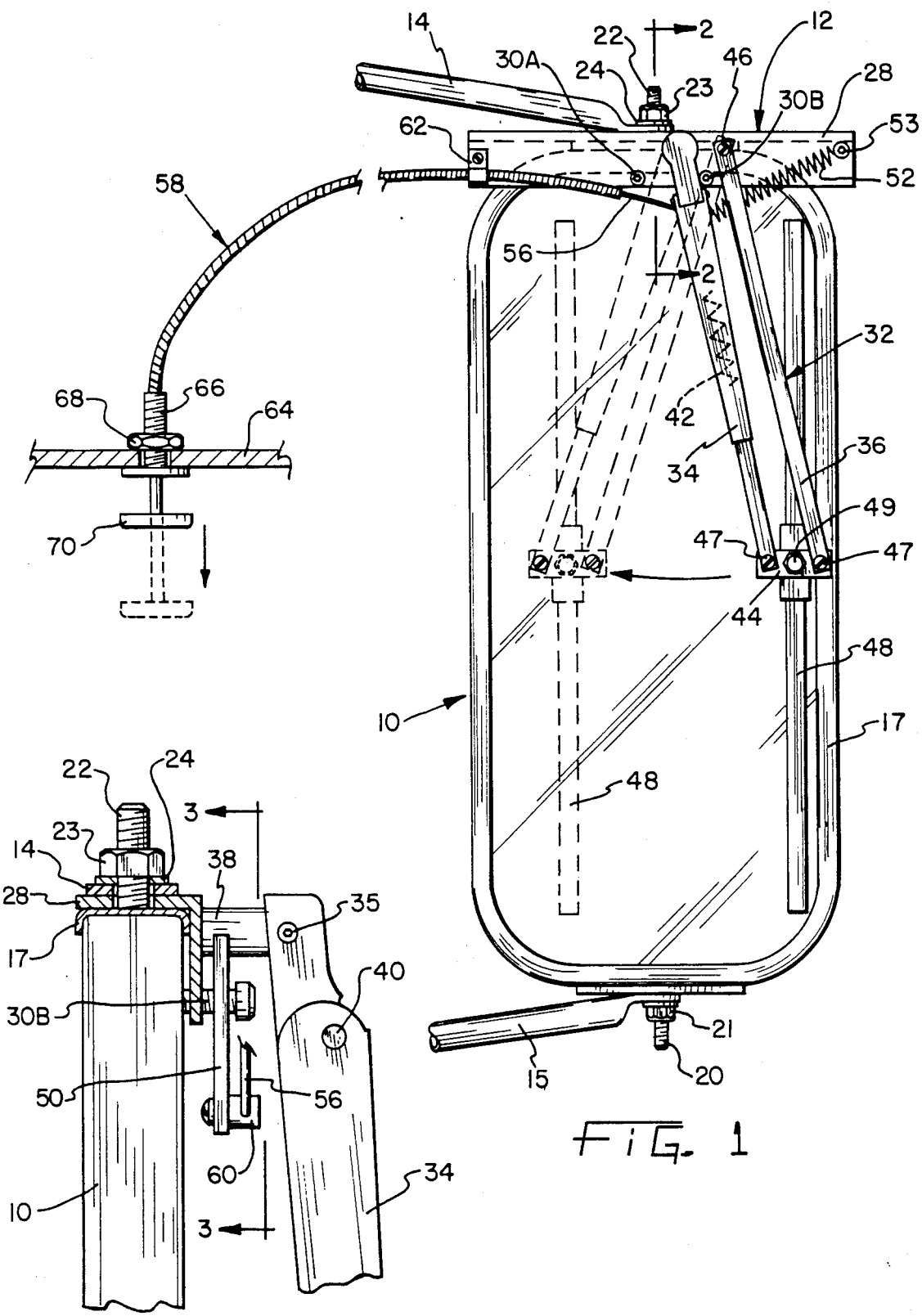
FIG. 1 is a front elevational view of a mirror with the wiper mechanism secured thereto.
FIG. 2 is a broken away cross sectional view taken along line 2—2 of FIG. 1.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Referring now to FIGS. 1 and 4, there is shown a mirror 10 and a wiper assembly 12. The mirror is attached to a door 18 of a truck cab 16 by means of a pair of brackets 14 and 15. As also shown in FIG. 4, door 18 is provided with a window 19. Bracket 15 is secured to the frame 17 of mirror 10 by means of a stud 20 and nut 21. Bracket 14 is secured to the frame of mirror 10 by means of a stud 22, a washer 24, and a nut 23. As best shown in FIG. 2, wiper assembly 12 includes a frame 28 which is secured to the frame of mirror 10 by means of the stud 22, nut 23, and washer 24.

Referring further to FIGS. 1-4, the frame 30 is, furthermore, provided by means of a pair of stops 30A and 30B and a wiper arm mechanism 32. Stops 30A and 30B, as further explained hereinafter, define the rest and stop positions of the wiper arm mechanism. Wiper arm mechanism 32 includes a control arm 34 which is secured to a hollow shaft 38 by means of a set screw 35. Hollow shaft 38 is pivotably mounted on a pin 39 whereby the entire wiper arm mechanism 32 may pivot about pin 39. Pin 39 is secured to frame 28 in any suitable manner such as by welding or by a threaded connection.

Control arm 34 is also provided with a pivot pin 40 whereby wiper arm 34 may pivot toward and away from mirror 10. A spring 42, which is housed inside control arm 34 and which is shown in dotted outline form in FIG. 1, biases the wiper arm mechanism 32 toward mirror 10. Wiper arm mechanism 32 also includes a guide arm 36 which is arranged in parallel with control arm 34 and is secured to frame 28 by means of a pivot pin 46. A connecting link 44 is provided to which the free ends of control arm 34 and guide arm 36 are connected by means of a pair of threaded screws 47. A blade assembly 48 is secured to connecting link 44 by means of a pin 49. Thus, it can be seen by reference to FIG. 1, that the entire wiper arm mechanism 32 may pivot about pin 39 so that blade assembly 48 describes an arc about pivot pin 39. By means of the double arm construction including control arm 34 and guide arm 36, blade assembly 48 remains relatively parallel to the sides of mirror 10 for proper wiping action. The blade assembly forms no part of the present invention and may be obtained from Anco Corporation of Michigan City, Ind.

Referring now to FIGS. 2 and 3, a power arm 50 is also secured to the hollow shaft 38 by means of welding or the like. Power arm 50 is connected to frame 28 by means of a tension spring 52 which is connected at one end by means of a screw or pin 53 to the frame 28 and at its other end hooks into an aperture 54 of power arm 50. Power arm 50 is also connected to a cable 56 by means of a pivoting connecting pin 60. Cable 56 forms part of a Bowden wire assembly as best seen in FIG. 1. Thus, spring 52 tends to bias power arm 50 and wiper arm mechanism 32 toward the right hand side of the mirror as seen in FIG. 1 and causes the wiper arm mechanism in its normal rest position to bottom out against stop 30B. Cable 56, however, when it is pulled in the leftward direction, as seen in FIG. 1, causes power arm 50 to pivot about pin 39 to the right as seen in FIG. 1 so that the wiper arm mechanism 32 bottoms out at the stop position which is defined by stop 30A. In FIG. 1, the wiper arm assembly is shown in dotted lines in an intermediate position as the wiper arm mechanism pivots about pivot pin 39.

As further seen in FIG. 1, Bowden wire 58 is clamped at one end to frame 28 by means of a clamp 62 and, furthermore, at its other end is supported remotely from the mirror 10 on a support surface 64, such as the vehicle dash or door, by means of a stud 66 and a nut 68. A manual control button 70 is provided, which, when operated as shown in the dotted line position in FIG. 1, causes wiper arm mechanism 32 to pivot from its rest position toward its stop position.

Thus, in operation, the wiper arm assembly 12 is mounted on the mirror frame 17 as shown in FIG. 1 and the control 70 and remote end of Bowden wire 58 are positioned within reach of the vehicle operator such as, for instance, on the vehicle dashboard or on the inside surface of one of the vehicle cab doors. It should be readily appreciated that wiper arm assemblies may be provided for both the left-hand and right-hand mirrors of a truck so that two controls would be mounted on the dashboard or on the inside surface of one of the cab doors. When the truck driver wishes to clean a mirror, he would simply pull on the control button 70 thereby causing the wiper blade assembly 48 to move across the mirror to its stop position where arm 50 bottoms out against stop 30A, thereby wiping the mirror surface clean. When the driver releases control 70, bias spring 52 will pull the wiper blade back across the mirror surface from its stop position to its rest position thereby resulting in further wiping of the mirror.

While a pivoting arrangement for wiper arm mechanism 32 is shown, other arrangements such as a linear wiper blade movement could be provided without departing from the spirit or scope of the invention. It should also be appreciated that a washer fluid supply mechanism could be provided whereby the truck driver could first squirt some cleaner fluid on the mirror before initiating the wiping operation.

It should also be appreciated that the entire wiper assembly may be sold as a kit for retrofitting of truck mirrors. The assembly of wiper assembly 12 to a mirror 10 is very simple by virtue of the simplicity of the construction of wiper assembly 12. It should be noted that a sufficient length of Bowden cable 58 should be provided with the kit so that slack in cable 58 may be provided to enable a vehicle door 18 to be opened without interference between the door 18 and the Bowden wire assembly 58.

The wiper assembly 12 may be mounted either at the top or the bottom side of a mirror 10. The top mounting arrangement of FIG. 1, is preferred since, generally, the bottom portion of rear view mirrors is primarily used for viewing and should remain unobstructed. The wiper assembly 12 is preferably manufactured from a durable non-corroding metal such as stainless steel, or from a plated material.

While not shown in the disclosed embodiment, a cap member could be provided to cover the frame of wiper assembly 12 in order to keep moisture, precipitation, and dirt from the operative portions of the wiper assembly. Such a cap would preferably be constructed of metal or molded plastic.

Referring now to FIG. 3A, an alternate embodiment of the wiper actuating structure is shown. The actuating mechanism for the wiper assembly is here shown as a pneumatic mechanism 78. A pneumatic cylinder 80 is shown which is secured to frame 28 by means of a pivot pin 82. The operating shaft 86 of hydraulic cylinder 80 is connected to power arm 50 by means of a clevis and jam nut assembly 85. Cylinder 80 is conventional and may be obtained from P.H.D. Inc. of Fort Wayne, Ind. The cylinder 80 is connected by means of a pair of air hoses 88 and 90 to an air valve 92 comprising a four-way valve. Valve 92 is conventional and is available from ADI Corporation of Newberg, Oreg. An air supply "A" of the vehicle shown diagrammatically at 100, supplies air to valve 92. Actuation of the air cylinder 80 is accomplished by means of a push button control 94 which is also conventional and which may be obtained from ADI Corporation of Newberg, Oreg. Two exhaust hoses 96 are provided for air valve 92. When actuator 94 is depressed, air valve 92 causes air to be supplied to cylinder 80 which will cause the wiper arm mechanism 32 to move from its rest position to its stop position defined by stop 30B. Valve 92 then causes air to be supplied through the second hose 90 to air cylinder 80 to cause the return stroke of the cylinder to take place for moving wiper arm mechanism 32 back from the stop position to the rest position. Thus, in this embodiment, the bias spring 52 has been eliminated. It should be noted that a single acting pneumatic cylinder arrangement could be provided so that spring 52 would need to be retained to provide the function of returning blade arm assembly to its rest position.

What has, therefore, been provided is a very reliable and effective yet simple wiper blade assembly which may be mounted on an existing mirror for remote control from the cab of a truck or other type of vehicle.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A wiper assembly for a rear view mirror, said assembly comprising:
    a frame independently mountable on a rear view mirror;
    a wiper arm mechanism having a first arm and a second arm arranged in parallel and operable between a rest position and a stop position, each of said first and second arms having a free end and a first end, said first ends being pivotably secured to said frame;
    at least one wiper blade;
    a connecting link connected to said first arm and second arm free ends, said wiper blade being coupled to said connecting link at a point located generally intermediate the ends of the blade;
    a return spring connected between said frame and said wiper arm mechanism to bias said mechanism to said rest position;
    a manually operated remote control means for actuating said wiper arm mechanism from said rest position to said stop position, said control means having a manually operable actuator, a first end connected to said wiper arm mechanism and a second end connected to said manually operable actuator; and,
    pivot means for pivoting said arm mechanism and a pair of stops for said mechanism wherein said frame is an L-shaped bracket with a centrally positioned slot for mounting on a rear view mirror frame, and said stops and said pivot means are mounted on said bracket.

2. The wiper assembly of claim 1 wherein said remote control means comprises a Bowden wire, said wire having one end connected to said wiper arm mechanism and a remote end connected to said manually operable actuator.

3. The wiper arm assembly of claim 1 wherein said manually operated remote control comprises a pneumatic cylinder, means for supplying air to said cylinder, and a manually operable actuator.

4. The wiper arm assembly of claim 1 wherein said manually operated remote control means comprises a double acting pneumatic cylinder, means for supplying air to said cylinder, a valve, and a manually operable switch, and wherein a single operation of said switch causes said valve to first move said wiper arm mechanism from said rest position to said stop position and then to return said wiper arm mechanism from said stop position to said rest position.

* * * * *